Feb. 17, 1925.
E. C. LITCHFIELD ET AL
1,527,145
FLEXIBLE CONVEYER FOR FERTILIZER DISTRIBUTORS
Original Filed Nov. 2, 1921    2 Sheets-Sheet 1
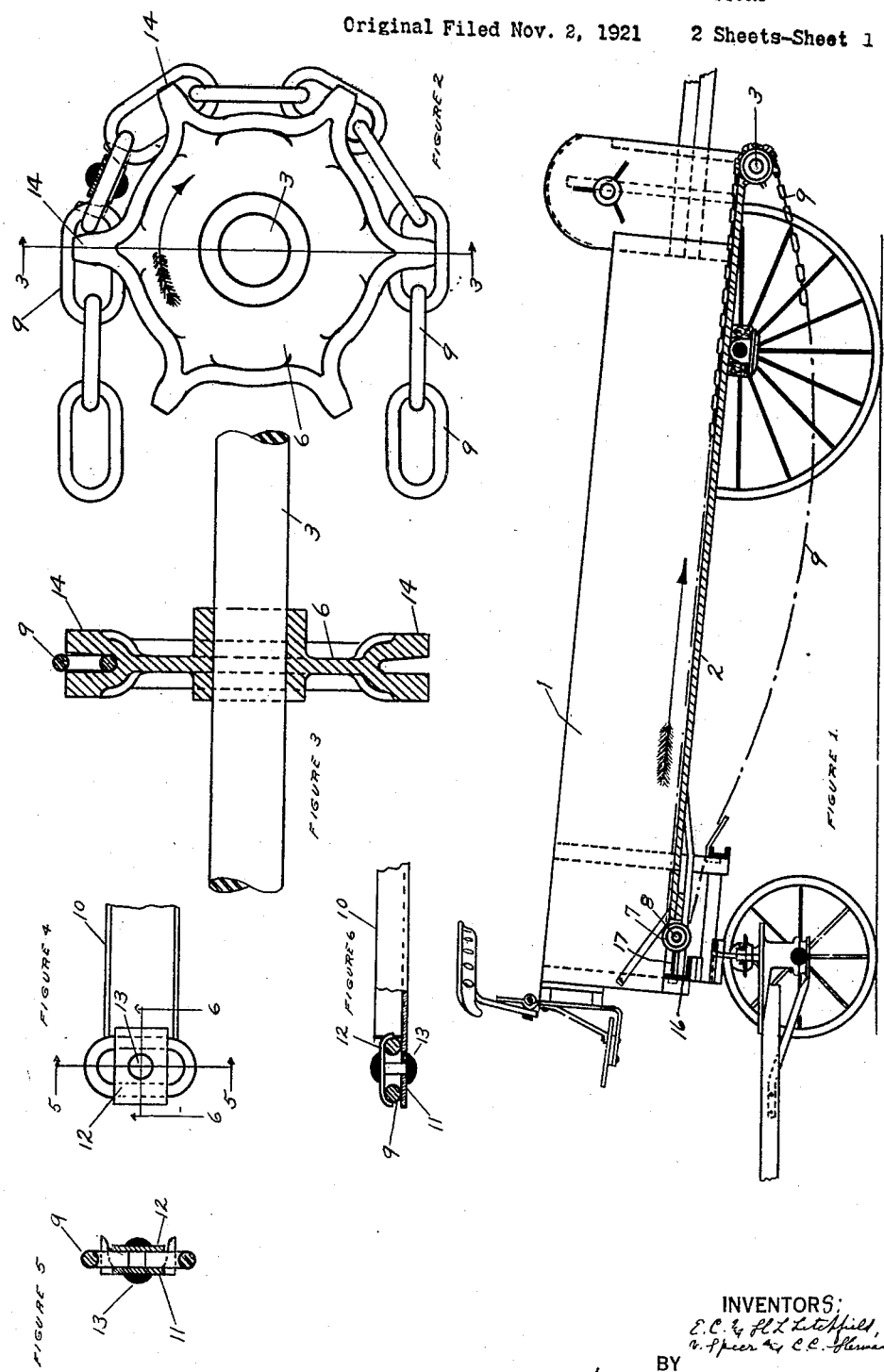
INVENTORS:
E.C. & H.L. Litchfield,
V. Speer & C.C. Hermann
BY
Chamberlin Freudenreich
ATTORNEY Feb. 17, 1925.
E. C. LITCHFIELD ET AL
1,527,145
FLEXIBLE CONVEYER FOR FERTILIZER DISTRIBUTORS
Original Filed Nov. 2, 1921    2 Sheets-Sheet 2
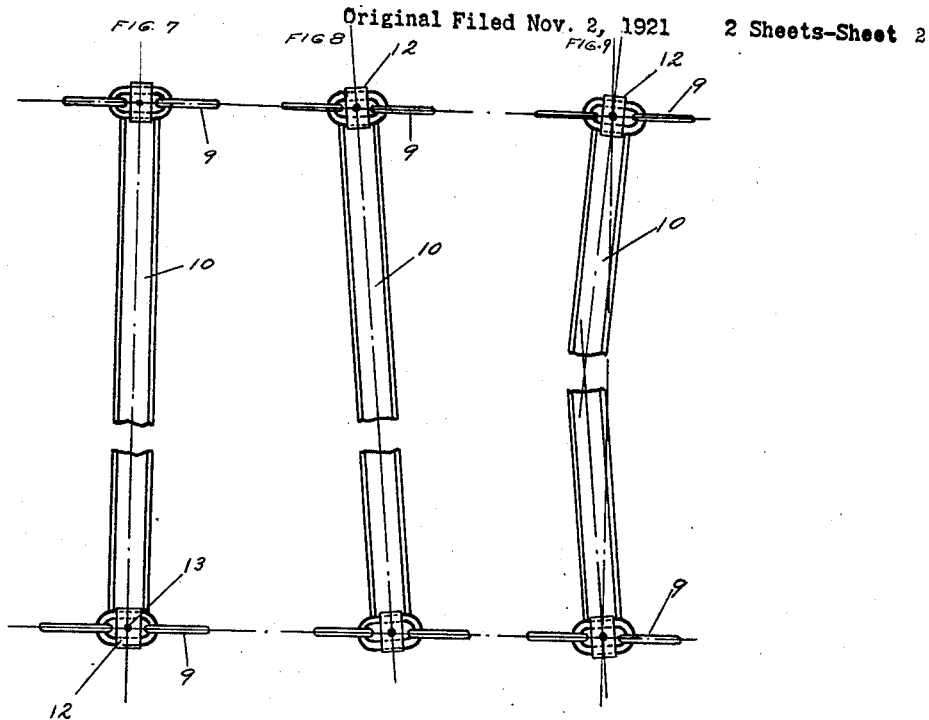
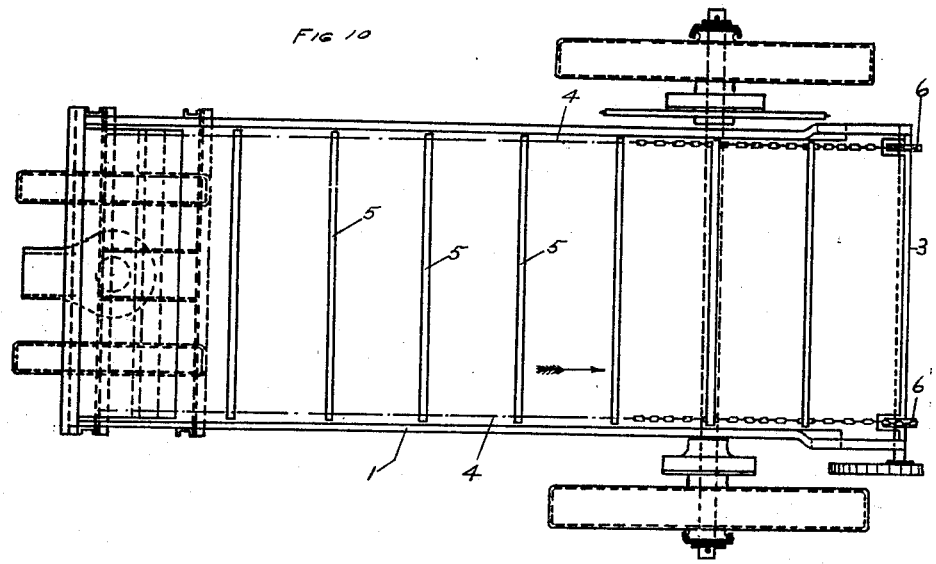
INVENTORS:
BY
ATTORNEY Patented Feb. 17, 1925.

1,527,145

UNITED STATES PATENT OFFICE.

EDGAR C. LITCHFIELD, OF CEDAR FALLS, HENRY L. LITCHFIELD, OF WATERLOO, VICTOR SPEER, OF CEDAR FALLS, AND CLARENCE C. HERMANN, OF WATERLOO, IOWA; SAID SPEER AND SAID HERMANN ASSIGNORS TO SAID EDGAR C. LITCHFIELD AND SAID HENRY L. LITCHFIELD.

FLEXIBLE CONVEYER FOR FERTILIZER DISTRIBUTORS.

Application filed November 2, 1921, Serial No. 512,255. Renewed October 24, 1924.

*To all whom it may concern:*

Be it known that we, EDGAR C. LITCHFIELD, HENRY L. LITCHFIELD, VICTOR SPEER, and CLARENCE C. HERMANN, citizens of the United States, residing at Cedar Falls, Waterloo, Cedar Falls, and Waterloo, respectively, in the county of Black Hawk, State of Iowa, have invented a certain new and useful Improvement in Flexible Conveyers for Fertilizer Distributors, and declare the following to be a full, clear, and exact description of the same, such as will enable others skilled in the art to which it pertains to make and use the same, reference being had to the accompanying drawings, which from a part of this specification.

In machines for distributing or spreading manure, straw or other fertilizers having a distributing mechanism at the rear end, it is necessary to provide some means for feeding the mass in the spreader body toward the distributing point as the distribution progresses. In some forms of spreaders the load-feeding means is made up of one or more endless chains the upper run or runs of which lie upon the bottom of the spreader body, cross slats or cleats being attached to the chain or chains to produce a ladder-like construction. The present invention relates to conveyers of the type to which we have just referred and has for its object to simplify and improve the construction of such conveyers, making them cheaper in construction, more durable, more efficient in operation, and less expensive in up-keep than conveyers heretofore used for this purpose.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a vertical longitudinal section through a spreader equipped with one of the improved conveyers;

Fig. 2 is a side elevation, on a larger scale, of one of the driving sprockets and a portion of one of the conveyer chains;

Fig. 3 is a section taken approximately on line 3—3 of Fig. 2;

Fig. 4 is a top plan view of one end of one of the slats, together with a chain link to which it is attached;

Fig. 5 is a section taken approximately on line 5—5 of Fig. 4;

Fig. 6 is a section taken on line 6—6 of Fig. 4;

Fig. 7 is a top plan view of one of the slats with fragments of conveyer chains at the ends, showing the parts in the normal or ideal positions;

Fig. 8 is a view similar to Fig. 7 showing an abnormal condition which occurs in practice, wherein one end of a slat advances ahead of the other end;

Fig. 9 is a view similar to Figs. 7 and 8, showing a condition in which a slat meets an obstruction so as to cause it to be bent; and Fig. 10 is a top plan view of the spreader.

Referring to the drawings, 1 represents the bed or body of a spreader of any usual or suitable construction having a closed bottom, 2; the body being open at the rear end for the discharge of the fertilizer. Across the rear end of the spreader, just below the bottom thereof, extends a shaft, 3, which is the driving shaft for the conveyer. The conveyer illustrated consists of two endless chains, 4, 4, connected together by slats, 5. The chains run over sprocket wheels, 6, fixed upon the driving shaft 3 and other suitable guiding wheels, 7, upon a shaft, 8, extending transversely of the spreader body in the vicinity of the front end.

Conveyers of the general type above outlined have always, as far as we are aware, been made of detachable link chains each of which therefore comprises a large number of parts and numerous journal bearings which, while they leave the chains flexible in one plane, make them practically stiff or rigid in a plane at right angles thereto. These chains, known as detachable link chains, are therefore expensive; the lack of flexibility in all directions results in certain disadvantages; and, in case of breakage of one of the chains at one point, other breaks may occur before the machine can be stopped, thus necessitating repairs at several places in addition to the repair at the initial breaking point. In accordance with our invention, we employ as the chain members of the conveyer ordinary log chains, made of welded links, 9, interlocked with each other. In manufacturing a conveyer, the log chains are cut to the proper lengths and the two ends of each are then connected together by what is known as a cold-shut link; this being the only joint that has to be made in any single chain. When the chains are placed in position in the spreader, half of the links of each lie in a vertical plane while the remaining links lie in planes at right angles to the vertical. The slats which connect the chains together are conveniently fastened to the links which, in the upper and lower runs of the chains, lie in horizontal or practically horizontal planes. In the arrangement shown, each of the slats, indicated at 10, is formed out of channel iron, the flanges of which are cut away at the ends so as to permit the web to extend underneath one of the links in each of the two chains in the form of a tongue, 11. Each tongue is fastened to the overlying link by means of a plate, 12, extending across the link and permanently fastened to the tongue by a rivet, 13, extending through the opening in the link. The links to which a slat is fastened preferably lie against the ends of the flanges of the channel so that there is no possibility of relative movements between the slat and the links to which it is attached, and therefore no possibility of wearing away the rivets. Although each slat is rigidly fastened to a link in each of the chains, yet each slat is connected at the ends by what may be termed universal joints to the two chains as a whole, because the links that are fastened to the slats can move freely, within limits, about two axes at right angles to each other, relatively to the two adjacent links. The conveyer as a whole therefore possesses great flexibility which permits the slats to take various other positions instead of that in which it extends at right angles to the two chains, without producing undesirable stresses which would occasion undue wear in the mechanism and perhaps permanently distort or even destroy some portion of the conveyer or the driving mechanism therefor. Thus, in Fig. 7 we have shown the normal or ideal relation between a slat and the chains; in Fig. 8 there is shown an abnormal condition in which one chain has advanced somewhat more rapidly than the other; and in Fig. 9 we have illustrated a condition in which a slat is found to have been severely bent. While the ideal conditions exist the ordinary detachable-link chains with their long pivot pins or journals paralleling the slats will operate satisfactorily but under either of the two conditions illustrated in Figs. 8 and 9, the lack of flexibility of the detachable-link chains in the plane containing the slats, will produce objectionable stresses and will so distort the conveyer that the chains will not register properly with the sprocket wheels; so that something is very likely to break and, in any event, there will be an unnecessary waste of energy in pulling the conveyer around. By using the log chains, however, the universality of the connection between the ends of the slats and the chains prevents the placing of any abnormal stresses on the chains and, furthermore, in passing over the sprocket wheels, the corresponding links in two chains, except those that are fixed to the slats, can adjust themselves from and toward each other so as to maintain accurate registration between the driving links and the sprocket chains.

The chains pass over the sprocket wheels, 6, on the driving shaft, the sprocket wheels being preferably of the special construction illustrated, in which each tooth is made in the form of a jaw, 14, of a size and shape to receive one of the vertically-arranged links; the jaw-like teeth being spaced far enough apart so that at least one of the links which lie flat may be received between two consecutive teeth. Preferably the teeth are spaced apart from each other the length of two of the links so that each of the vertically-arranged links will enter one of the jaws and each of the other links will be engaged at its rear end by the advance face of the jaw or tooth and be driven thereby.

It will be seen that if one of the chains breaks, it will be simply dragged around without causing any undue stresses to be placed on the unbroken portions thereof or on the other chain, so that repairs may be made by simply inserting a new link for the broken one. Furthermore, since all of the wear that takes place is in the links themselves and not in hidden journal bearings, the user of the spreader can at any time make a quick and easy inspection of the condition of the conveyer and thus know definitely just what its condition is.

The conveyer may be kept under the proper tension by adjusting the front shaft, 8, back and forth. In the arrangement shown, the wagon body has at the front end a transverse steel frame member, 16, through which pass adjustable bolts, 17, extending to the shaft.

While we have illustrated and described with particularity only a single preferred form of our invention, it will of course be understood that our invention is not limited to the exact structural details thus illustrated and described, and we intend to cover all forms and arrangements which come within the terms employed in the definitions of our invention constituting the appended claims.

We claim:

1. In a machine of the character described, a conveyer including two parallel endless log chains each having half of its links arranged in a vertical plane and the remainder lying flat, and a series of rigid slats extending between said chains and each rigidly secured to two of the ordinary flat-lying links.

2. In a machine of the character described, a conveyer including two parallel endless log chains, and a series of rigid slats extending between said chains and each rigidly connected to ordinary links in both chains.

3. In a machine of the character described, a conveyer including two parallel endless log chains each having half its links arranged in a vertical plane and the remainder lying flat, a series of parallel channel irons extending between said chains, each channel iron having the flanges cut away at the ends so as to permit the web to extend in the form of tongues under ordinary flat-lying links in each chain, and means for rigidly connecting said tongues to the overlying links.

4. In a machine of the character described, a conveyer including two parallel endless log chains each having half its links arranged in a vertical plane and the remainder lying flat, a series of parallel channel irons extending between said chains, each channel iron having the flanges cut away at the ends so as to permit the web to extend in the form of tongues under ordinary flat-lying links in each chain, and means for rigidly holding the last mentioned links to said tongues and against the ends of the webs of the said channel irons.

5. In a machine of the character described, a log chain having half its links arranged in a vertical plane and the remainder lying flat, a slat extending across one of the flat links, a plate overlying the opposite side of the latter link; and a rivet passing through said plate, through the opening in the link, and through said slat so as rigidly to connect the slat to the link.

6. In a machine of the character described, a conveyer including a log chain having a portion of its links arranged in a vertical plane and the remainder lying flat, a sprocket wheel over which said chain passes, said sprocket wheel having teeth in the form of jaws each adapted to receive one of the vertical links and engage with the rear end of one of the flat-lying links, and transverse rigid slats arranged at intervals along said chain and rigidly secured to certain of the ordinary flat-lying links.

7. In a machine of the character described, a conveyer including two parallel endless chains each containing links lying flat in a horizontal plane and open in the center, a series of parallel structural-iron slats extending between said chains, each slat having horizontal web and vertical flange sections, the flanges of said slats being cut away at the ends so as to permit the web portions to extend in the form of tongues underneath flat-lying links in each chain, a plate extending across the top of each flat-lying link below which one of said tongues extends; and a rivet extending through each of said plates, through the open center of the corresponding link, and through the underlying tongue.

In testimony whereof, we sign this specification.

EDGAR C. LITCHFIELD.
HENRY L. LITCHFIELD.
VICTOR SPEER.
CLARENCE C. HERMANN.